United States Patent [19]

Koenck et al.

[11] Patent Number: 5,052,020
[45] Date of Patent: Sep. 24, 1991

[54] METHOD OF AND APPARATUS FOR CONTROLLING MODULATION OF DIGITAL SIGNALS IN FREQUENCY-MODULATED TRANSMISSIONS

[75] Inventors: Steven E. Koenck; Ronald L. Mahany, both of Cedar Rapids, Iowa

[73] Assignee: Norand Corporation, Cedar Rapids, Iowa

[21] Appl. No.: 467,096

[22] Filed: Jan. 18, 1990

[51] Int. Cl.$^5$ ............................................. H04L 27/12
[52] U.S. Cl. ...................................... 375/62; 375/76; 332/125
[58] Field of Search ............................. 375/62, 98, 76; 455/115, 116; 332/100, 117, 118, 125; 307/530, 356, 358

[56] References Cited

U.S. PATENT DOCUMENTS

| | | | |
|---|---|---|---|
| 4,207,527 | 6/1980 | Abt | 332/125 |
| 4,540,897 | 9/1985 | Takaoka | 375/76 |
| 4,556,983 | 12/1985 | Heitmann et al. | 375/60 |
| 4,584,690 | 4/1986 | Cafiero et al. | 375/60 |
| 4,897,857 | 1/1990 | Wakatsuki et al. | 375/76 |
| 4,910,753 | 3/1990 | Wakatsuki et al. | 375/76 |

*Primary Examiner*—Stephen Chin
*Attorney, Agent, or Firm*—Neuman, Williams, Anderson & Olson

[57] ABSTRACT

A signal amplitude shaping circuit is interposed between a signal source and a signal input terminal of a frequency modulation circuit of a typical voice radio transmitter or transceiver unit. The amplitude shaping circuit includes a high-impedance sampling circuit which senses the steady state bias voltage at the signal input terminal during periods when no data are being transmitted. Upon receipt of a transmit-enable signal, the most recently sensed bias voltage is stored and positive and negative offset voltages are generated with respect to the stored voltage. One of the offset voltages is adjusted as a precisely determined voltage with respect to the stored voltage. The other of the offset voltages is generated by inverting the first, adjusted voltage, such that the two offset voltages are offset by equal values in opposite directions. An analog switch is adapted to receive a sequence of digital signals and to apply the positive and negative offset voltages to the signal input terminal in a sequence corresponding to the binary signal sequence of the received data signals.

25 Claims, 2 Drawing Sheets

METHOD OF AND APPARATUS FOR CONTROLLING MODULATION OF DIGITAL SIGNALS IN FREQUENCY-MODULATED TRANSMISSIONS

BACKGROUND OF THE INVENTION

1. Field of the Invention

The invention relates generally to digital signal transmissions and particularly to frequency-modulated radio frequency transmissions of digital signals.

2. Discussion of the Prior Art

Frequency modulated ("FM") radio technology for voice communications is well established. Carrier frequencies are typically generated by crystal oscillator circuits. Such basic crystal oscillator circuits are coupled to or integrated with well known and commercially available modulation circuits. Crystals are known elements for sustaining oscillations at characteristic frequencies in such well known circuits. Even though, present communications standards are of such stringency that temperature compensation networks become necessary to enable such circuits to maintain an established center frequency over a specified temperature range. Thermistor-based compensation networks are typically used to stabilize carrier frequencies of crystal oscillator circuits over typically specified temperature ranges, such as from negative thirty degrees centigrade to positive sixty degrees centigrade.

A typical FM modulating circuit includes a series coupled combination of a capacitor and a varactor diode. The varactor diode of such circuit is reverse-biased to ground and its cathode is coupled to one terminal of the capacitor. The second terminal of the capacitor is coupled to the crystal oscillator circuit such that the equivalent capacitance of the series-coupled varactor diode and capacitor combination become a frequency determining capacitance element in the crystal oscillator circuit. The node between the varactor diode and the capacitor is adapted to receive a voltage type signal input for modulating the center frequency output of the crystal oscillator circuit. Variations in voltages of input signals to the node results in corresponding shifts in the reactance of the varactor diode and, hence, the frequency of oscillation of the oscillator circuit. In the absence of a modulating voltage shift at the node, a steady state voltage at the cathode of the reverse-biased varactor diode constitutes a signal voltage reference at which the crystal oscillator circuit oscillates at its unmodulated center frequency. In that such voltage at the signal input node is critical to the stability of the center frequency of the crystal oscillator, a circuit for stabilizing typical frequency drifts over an operational temperature range is directly coupled to the node between the varactor diode and the capacitor. Such a temperature compensation circuit changes the voltage at the cathode of the varactor diode over the effective temperature range in such a manner that the center frequency output of the oscillator circuit remains stable over such range. In operation of the described circuit, a voltage modulation input to the node, such as the electrical output from a microphone in response to its reception of sound or speech, results in a correspondingly modulated frequency output of the crystal oscillator circuit.

Voice signals typically have no DC component. Such signals can consequently be superimposed through a series-coupled input capacitor on the established, temperature compensated voltage at the node. Without a DC current input to the node the reference voltage at the node and, hence, the center frequency of the circuit remain stable. If capacitive coupling is not used, and the signal impressed on the input node includes a DC component which differs from the temperature-compensated steady state reference voltage at the node, the reference voltage at the node would be shifted. Such shift, in turn, would shift the center frequency of the transmission signal with respect to which the modulated signal is centered. Depending on the magnitude of the voltage shift, the modulated frequencies may become shifted beyond allowable limits, such as, for example, those established by the Federal Communication Commission.

Digital data signals typically include a DC component which causes such signals applied through the referred-to capacitive coupling to become distorted with what is referred to as "jitter". In fact, data signals will vary in their DC component in an unpredictable manner, depending on the sequence of data presented for transmission. To control distortion of digital data signals which are applied to the modulation circuit through a capacitively coupled terminal, electronic transformation or encoding of data pulses is used. According to one particular technique referred to as biphase coding, each signal pulse is split into two components. A positive pulse or "one"-pulse may be split into a first, positive signal component and a second, negative signal component. Conversely, a "zero"-pulse, also referred to as ground or negative pulse, may be represented by a first, negative component, followed by a second, positive component. In such an encoding scheme each pulse, whether positive or ground, and consequently any combination or string of data pulses, would be balanced about a ground datum and may then be applied through a capacitor to the referred-to modulation circuit. A problem is likely to be encountered, however, in decoding the encoded signals, particularly in synchronizing the decoding circuits to allow them to decipher the received transmissions. A loss or addition of a single bit would be likely to cause an entire data transmission to become scrambled.

A further disadvantage of the previously described coding or modulation method is that two modulation transitions are required to transmit each binary bit of information. Since data signalling speed is typically limited, such as by the channel bandwidth, the described coding or modulation method reduces the maximum available data transmission rate to one half of the otherwise available rate.

Consequently, it would be desirable to be able to transmit digital signals over traditional voice frequency transceiver units without a need for encoding and subsequently decoding the data signals and not to be concerned about eliminating DC components from a digital data string.

SUMMARY OF THE INVENTION

It is therefore an object of the present invention to provide a means for allowing a traditional voice frequency radio transceiver to be used for transmission of digital data messages without a need for eliminating a DC component from the digital data codes.

It is another object of the invention to provide a means for referencing a string of digital data to a voltage datum at an input node before applying the data to the node.

In accordance with the invention, a circuit for adjusting a signal amplitude of timed, digital signals with respect to a reference voltage includes a sampling circuit which samples and stores a steady state reference voltage representative of an unmodulated frequency or center frequency of an FM transmitter during a non-transmit or rest period of the transmitter. A signal shaping circuit, in interacting with the sampling circuit, references with respect to the voltage stored during the rest period the amplitudes of signal voltages of digital data transmitted to the amplitude adjusting circuit during a transmit or active period.

According to another aspect of the invention, a frequency modulation circuit for digital data transmissions comprises a voltage referencing and signal shaping circuit wherein a sampling input terminal is selectively coupled to the signal input node of the crystal oscillator circuit. A switch couples the sampling input terminal to the signal input node of the crystal oscillator circuit during rest periods when no signals are being transmitted, and interrupts the coupling between the sampling input terminal and the signal input node when a string of data is to be transmitted. The string of data pulses is converted to respectively positive or negative voltage pulses referenced with respect to the sampled voltage at the node, such that a resulting modulated data message output of the crystal modulator is referenced with respect to a steady state bias voltage determinative of the center frequency existing at the beginning of the transmission period of digital data pulses.

A method of adjusting a signal amplitude of timed digital signals to a reference voltage includes sensing, during a period of non-transmission of such timed digital signals, a bias voltage representative of an unmodulated frequency at a signal terminal of a radio frequency transmitter of frequency modulated signals. Signal voltages of a predetermined negative and positive offset from such sensed bias voltage are then generated. The generated voltages are thereafter selectively applied to the signal terminal in a sequence of high and low data pulses of such timed digital signals.

BRIEF DESCRIPTION OF THE DRAWINGS

The Detailed Description of the Invention including a detailed description of a preferred embodiment thereof will be best understood when read in reference to the accompanying drawings wherein.

DETAILED DESCRIPTION OF THE INVENTION

Figure 1:
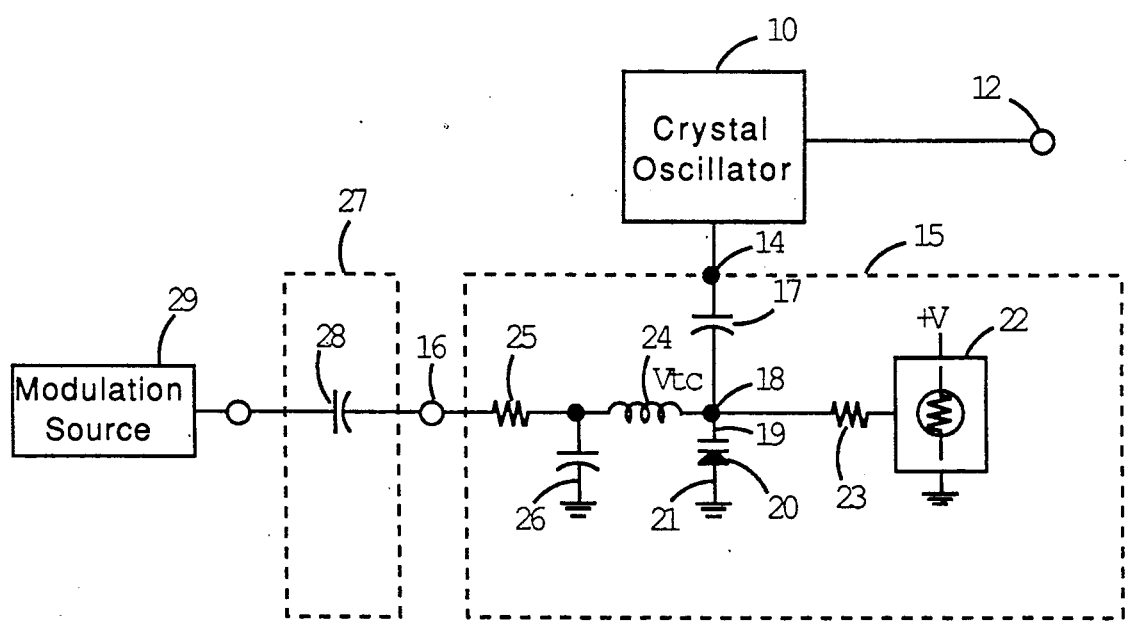
FIG. 1 is a schematic diagram of a representative modulation and crystal oscillator circuit of the prior art to which the present invention applies.

Referring briefly to FIG. 1, a typical, prior art crystal oscillator circuit 10 is shown as having a modulated output terminal 12 and a signal input terminal 14. The signal input terminal 14 represents an open end of a capacitive loading network of the oscillator circuit 10. A modulation circuit designated generally by the numeral 15 is interposed between the signal input terminal 14 of the oscillator circuit 10 and a signal source. A modulation input terminal 16 of the modulation circuit 15 constitutes the input terminal for signals be modulated. A capacitor 17 is coupled at a node 18 to a cathode side 19 of a varactor diode 20. A respective anode 21 of the varactor diode 20 is coupled to ground. The node 18 functions as a signal input node of the oscillator circuit 10 in that the magnitude of the voltage at the node 18 directly affects the frequency at which a crystal of the oscillator circuit 10 oscillates. A temperature compensation network 22, such as a typical thermistor-based variable voltage divider circuit is coupled through an input impedance 23, such as the resistor 23 shown in FIG. 1 to the node 18. A temperature related bias voltage coupled through the impedance 23 counteracts typical temperature-related frequency changes of the oscillator circuit 10, such that the unmodulated center frequency of the oscillator circuit is maintained within a small tolerance over the specified operational range of the circuit.

The combination of an inductor 24 coupled to the node 18, a resistor 25 coupled to the modulation input terminal 16 and a capacitor 26 coupled to a node between the inductor 24 and the resistor 25 and to ground form a blocking circuit to prevent the radio frequency signals of the crystal oscillator circuit from appearing at the modulation input terminal 16. The oscillator circuit 10 and the modulation circuit 15 are considered to be typical elements of state of the art FM radio transceivers or transmitters (not shown), by which signals generated by the oscillator circuit 10 may be transmitted via typical antennae to respective receiver units (not shown).

At high, radio frequencies of the oscillator circuit, the inductor 24 becomes a high impedance element and functions in essence as an open circuit connection, while the capacitor 26 becomes a low impedance element, shunting any high frequency signal component to ground. Conversely, to the frequency of digital data transmission signal inputs, the inductor 24 appears as a short circuit, passing the digital data signals while the capacitor 26 functions in essence as an open circuit, so as not to deteriorate the signal quality of a data pulse string. In the absence of significant current flow through the resistor 25, a steady state bias voltage at the modulation input terminal 16 is essentially the same as the voltage at the node 18 of the modulation circuit 15.

A capacitive coupling circuit designated generally by the numeral 27 and represented more specifically in the diagram of FIG. 1 by a capacitor 28 is typically interposed between the modulation input terminal 16 and a modulation signal source 29, such as microphone or other amplified voice or sound signal source. Being coupled to the modulation input terminal through the interposed capacitor 28, any DC component in the signal source with respect to the temperature compensated voltage at the node 18 of the modulation circuit 15 is isolated. The AC signal component at voice or sound frequencies passes through the capacitor 28 and is superimposed on the existing voltage at the node 18. As previously mentioned, it is desirable to implement a digital signal input without the need for the capacitive coupling and, furthermore, without concern that a DC component of a digital data input signal may not be matched to the steady state voltage at the node 18.

Figure 2:
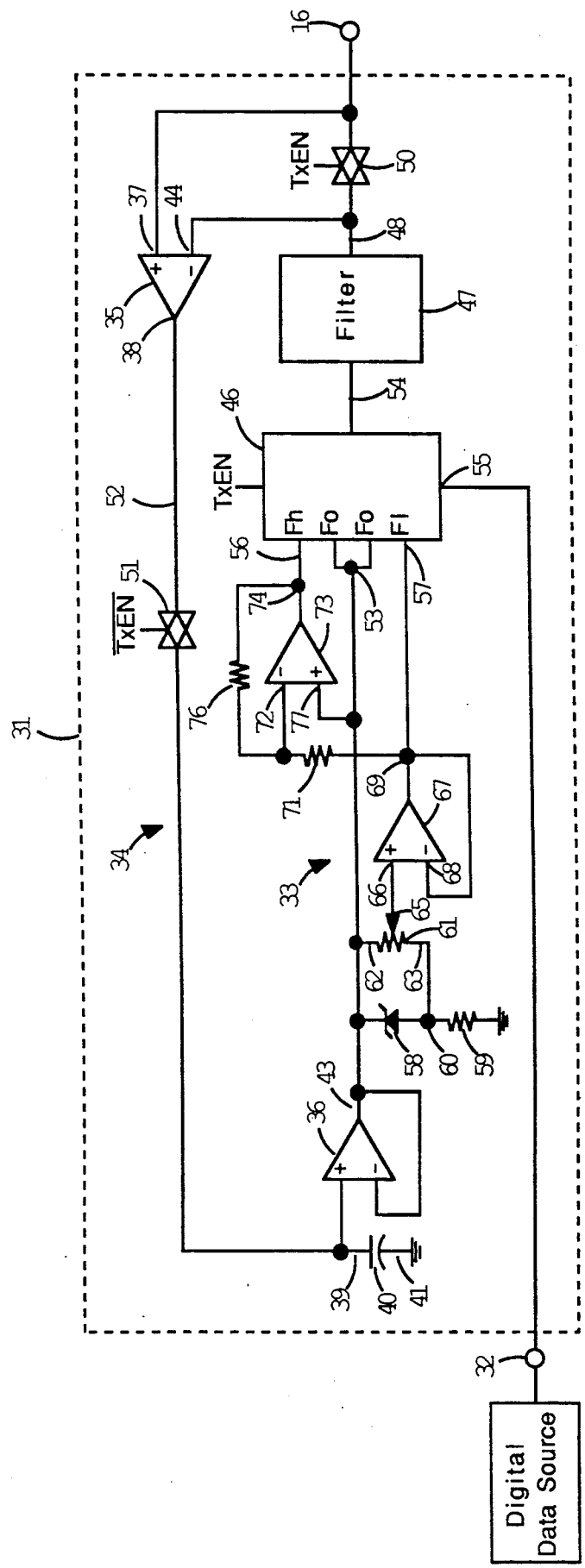
FIG. 2 is a schematic diagram of a digital data transmission signal input shaping circuit in accordance with the present invention.

Referring now to FIG. 2, a digital data transmission shaping circuit, designated generally by the numeral 31 is interposed between a transmitted data input terminal 32 and the modulation input terminal 16. The prior art capacitive coupling circuit 27 is not used. Consequently, the modulation input terminal 16 of the modulation circuit 15 described with respect to FIG. 1 is also equivalent to a signal output terminal of the shaping circuit 31. The transmitted data input terminal 32 may be coupled to, and is symbolically representative of an input terminal for any of a number of sources of digital data which may be generated, transmitted or otherwise provided to be applied to the modulation input terminal 16. Digital data may be a single data pulse or a string or train of data pulses comprised of any combination of logical "ones" and "zeroes", hence data pulses of typically two different voltages with respect to a reference voltage. Frequently, one of the voltages is at ground which is also used as the reference. However, depending on the source of such data pulses as they may be applied to the transmitted data input terminal 32, the voltages of the "ones" or "zeroes" may vary from desired standards. Also prior transmission or manipulation of the data pulses may have altered their magnitudes from precise, pre-established voltages. Thus, instead of applying the digital signal from its source directly to the modulation input terminal 16 as a data terminal, the digital signal is first applied to the transmitted data terminal 32. The shaping circuit 31 generates signal levels, or voltages of a predetermined amplitude, which voltages are then applied in substitution to the terminal 16 as herein further described.

The shaping circuit 31 includes a signal level or voltage referencing functional component group 33 which interacts with a quiescent, or steady state, signal level, or bias voltage sampling circuit 34. The bias voltage sampling circuit 34 includes first and second operational amplifiers 35 and 36, respectively. The first amplifier 35 has its noninverting high-impedance input terminal 37 coupled to the modulation input terminal 16 of the modulation circuit 15 (see FIG. 1). An output signal terminal 38 of the first amplifier 35 is coupled to the positive terminal 39 of a capacitor 40 which is coupled through a second terminal 41 to ground. The positive terminal 39 of the capacitor 40 is further coupled to a noninverting high-impedance input terminal of the second amplifier 36. A respective, inverting high-impedance input terminal 42 of the second amplifier 36 is coupled to its output terminal 43 to configure the second amplifier 36 to operate as a voltage follower.

Coupled in such a manner, the second amplifier 36 generates an output voltage signal of a magnitude equal to the voltage stored in the capacitor 40. If the capacitor 40 were isolated from a voltage source signal, a decay of the voltage stored in the capacitor 40 would depend on the time constant of the combination of the capacitor 40 and the second amplifier 36. The time constant can be chosen to enable such a circuit to provide a stable voltage signal with negligible decay over all practical operating periods of the shaping circuit 31 as may be contemplated in accordance herewith.

A reference signal level, or voltage, of desirable magnitude for shaping signal amplitudes of a string of data signals becomes stored in the capacitor 40 during a sampling phase of the shaping circuit 31. During the sampling phase, no data transmission takes place. In the absence of data at the modulation input terminal 16, the steady state quiescent bias signal level, or voltage, at the node 18 (see FIG. 1) is sensed at the high-impedance input terminal 37 of the first amplifier 35. In applying the sensed voltage through the output of the first amplifier 35 to the capacitor 40, the output signal of the second amplifier 36 is coupled back to an inverting input terminal 44 of the first amplifier 35. The feedback coupling of the amplified output from the second amplifier 36 enables the first amplifier 35 to function in a voltage follower mode. In such mode, the high-impedance input at the noninverting terminal 37 appears at the output terminal of the first amplifier to be applied to the capacitor 40. This latter functional feedback coupling is established through a normally neutral or unswitched path of an analog switch 46 and through a filter 47.

During the voltage sampling phase, an output terminal 48 from the filter 47 remains isolated from the modulation input terminal 16 by a solid state switch 50 which remains open during the voltage sampling phase and is driven into a closed or shorted state at the beginning of a signal transmission by a transmit-enable signal, as identified in FIG. 2 by the designation "TxEN". The open state of the switch 50 during the voltage sampling or non-transmit phase also isolates the steady state bias voltage at the modulation input terminal 16 from being shorted to the feedback voltage at the output terminal 48 of the filter 47.

A complementary solid state switch 51 is coupled into an output lead 52 from the first amplifier 35 to the capacitor 40. The switch 51 remains closed during the steady state voltage sampling phase of circuit 31 to be opened by a transmit-enable signal, such function being identified schematically in FIG. 2 by the inverse of "TxEN" (the inverse being identified in the drawings in a conventional manner by a bar above the term "TxEN"), to isolate the capacitor 40 from the output signal of the first amplifier 35 at the beginning of and for the duration of a data transmission phase of the circuit 31. As the switch 51 opens, its complementary switch 50 closes to couple the output terminal 48 of the filter 47 to the modulation input terminal 16.

The transmit-enable signal is also applied to the analog switch 46, setting the switch 46 from its $F_0$ or rest position to a signal transmit position. In the described embodiment, the switch 46 is a typical circuit having two sets of switchable terminals. One such set of two terminals is coupled together or in parallel to form a single terminal 53, also designated on the diagram in FIG. 2 by $F_0$. In the rest position, namely the absence of the "T×EN" signal, the switch 46 couples the output voltage of the second amplifier 36 between the terminal 53 and an output terminal 54 to apply the output voltage of the second amplifier 36 to the filter 47. However, in response to the presence of the transmit-enable signal, the switch 46 becomes conditioned to toggle between high and low signal voltage terminals 56 and 57 ($F_h$ and $F_l$) to pass respective high or low data pulses to the filter 47 in response to high or low data input signals as they may occur at the transmitted data terminal 32 and be applied to a respective data terminal 55 of the switch 46.

The precise magnitude or amplitude of the high and low signal voltages applied to the respective terminals 56 and 57 are established by the components of the voltage reference group 33. Both the high and low voltages are referenced with respect to the output voltage signal or voltage level of the second amplifier 36, hence, they are referenced with respect to the sampled steady state voltage of the modulation circuit 15, as stored in the capacitor 40. A voltage reference element 58, which may be a Zener diode as shown in FIG. 2, is coupled through a bias resistor 59 to ground. At a node 60 between the reference element 58 and the resistor 59, the reference element 58 establishes a voltage below but also at a precisely fixed value with respect to the output voltage of the second amplifier 36. An adjustable resistor 61, such as a precision potentiometer, is coupled with its terminals 62 and 63 across the terminals of the reference element 58. An adjusted voltage output appears at a slider or variable output terminal 65 of the potentiometer 61. The adjusted voltage output at the terminal 65 is coupled to a noninverting input terminal 66 of a third operational amplifier 67. An inverting input terminal 68 of the amplifier 67 is coupled to an output terminal 69 of the third amplifier 67, to operate the third amplifier 67 also in a voltage follower mode.

The output signal level, or voltage, of the amplifier 67 may, consequently, be adjusted through the adjustable resistor 61 to a predetermined value between the sampled steady state voltage of the modulation circuit 15, as stored in the capacitor 40, and the negatively offset voltage established by the reference element 58. Such an adjustment is made available for tuning the described circuit to obtain precisely determined data voltages for frequency modulation purposes as will become apparent from the further description of the signal shaping circuit and its function. In that present standards prescribe acceptable ranges for frequency modulated signals in digital signal transmissions according to which the frequency of FM signals may vary, for example, by no more than 5 parts per million from a reference frequency, accurate adjustments of the offset voltages are important. The output terminal 69 of the third amplifier 67 showing a properly adjusted offset voltage value is coupled to the low voltage terminal 57 of the analog switch 46 and through a resistor 71 to an inverting input terminal 72 of an inverter amplifier 73. An output voltage of the amplifier 73 is, hence, fed back from an output terminal 74 through a feedback resistor 76 of a resistance equal to that of the resistor 71 to the inverting input terminal 72 of the amplifier 73. A noninverting terminal 77 of the amplifier 73 is coupled directly to the output lead of the second amplifier 36, thereby precisely referencing the offset value of the inverted voltage to the voltage output from the second amplifier 36, hence to the sampled reference voltage stored in the capacitor 40. The output voltages from the respective amplifiers 67 and 73 are consequently offset by an equal amount from the reference voltage, but, respectively, toward the positive and negative side of the reference voltage. The voltage output from the amplifier 73 is applied to the high voltage terminal 56 of the analog switch 46.

After the transmit-enable signal has set the switches as described, a digital data string applied to the transmitted data terminal 32 toggles the analog switch 46 to couple either the high voltage terminal 56 or the low voltage terminal 57 to the filter 47. In response to a high or positive binary data signal level appearing at the data terminal 55 of the analog switch 46 the voltage output from the amplifier 73 is passed through the switch 46 to the filter 47. Conversely, in response to a low or negative binary data signal appearing at the data terminal 55, the switch 46 passes the voltage output from the amplifier 67 to the filter 47. The analog switch 46 in combination with the above described voltage reference component group 33 provides the means for generating a voltage signal of a precisely referenced amplitude or magnitude which corresponds in duration and in its logical value, whether "high" or "low", to the digital signal to be applied to the node 18 via the modulation input terminal 16.

The filter 47 is a typical data transmission filter which shapes transitional profiles of the data pulses in preparation for their application as a frequency modulation input at the node 18. The respective magnitudes of the voltages applied to the filter 47 remain referenced with respect to the steady state DC bias voltage at such node 18. This reference voltage may differ minutely between two successive data transmissions, in that the DC bias voltage at the node 18 may slowly change over a period of time as a result of changing temperature in the oscillator circuit. However, as described herein above, the reference voltage is not updated during the transmission cycle of digital data. Instead, when at the beginning of a data transmit cycle the continuous voltage sampling process is interrupted, the reference voltage sampled at the node 18 becomes fixed or frozen in the capacitor 40. Thus, at the beginning of the transmission of a data string, the most recent value of the steady state voltage at the node 18 is stored in the capacitor 40 and remains stored during the transmission of the data string. A DC component of the transmitted data string applied to the node 18 which might have shifted the reference voltage $V_{tc}$ to higher or lower values during the transmission of the data string has virtually no effect on the magnitudes of the applied voltages. Thus, harmful frequency shift effects of any DC component of the digital data transmission are avoided.

Of course, temperature related frequency swings are substantially eliminated by already existing standard temperature compensation circuits, such as the circuit 22. Since the temperature compensated values of the steady state voltage at the node 18 at any given temperature are constantly sampled and are locked into the capacitor only at the beginning of any data transmission, temperature related errors are virtually precluded. Typical data strings are not of such length to permit any significant temperature change during the typical transmission period of such data strings. At the conclusion of any such transmission period, the transmit-enable signal is removed, the solid state switch 50 returns to its open, nonconductive state, the complementary switch 51 assumes its closed or conductive state, and the analog switch 46 becomes conditioned to pass the output from the second amplifier 36 to the filter 47. This allows the voltage at the node to return to the steady state voltage as established by the temperature compensation network 22. The sampling circuit 34 assumes its sampling function and receives changes in the steady state voltage at the data input node as may appear as a result of required temperature compensation. Consequently, any subsequent data transmission will be referenced to the most recent steady state voltage sampled at the node 18 in accordance with the signal referencing techniques described herein.

Various changes and modifications in the structure of the described embodiment are possible without departing from the spirit and scope of the invention which is sought to be defined by the full scope of the terms of the claims appended hereto and their reasonable equivalents.

What is claimed is:

1. A circuit for adjusting a high signal amplitude and low signal amplitude of timed digital signals with respect to a reference voltage, comprising:
   a signal terminal;
   means for sensing a voltage at the signal terminal;
   means for providing a timed digital signal for application to the signal terminal;
   means for storing the voltage sensed at the signal terminal immediately preceding the occurrence of a timed digital signal;

means for generating a voltage of a predetermined amplitude in reference to the sensed, stored voltage;
   means for adding the generated voltage to the stored voltage on the signal terminal during the occurrence of the high levels of the timed digital signal; and
   means for subtracting the generated voltage from the stored voltage on the signal terminal during the occurrence of the low levels of the timed digital signal.

2. A circuit for adjusting a signal amplitude of timed digital signals with respect to a reference voltage, comprising:
   a signal terminal;
   means for sensing a voltage at the signal terminal comprising first and second amplifiers, the first amplifier having a noninverting input terminal coupled to the signal terminal and an output coupled to a noninverting input terminal of the second amplifier, the second amplifier having an output coupled back to its inverting input to configure the second amplifier in a voltage follower mode, the output of the second amplifier being further coupled to an inverting input terminal of the first amplifier to configure the first amplifier in a voltage follower mode, and a capacitor coupled with a positive terminal to the output of the first amplifier and with a negative terminal to ground, whereby a voltage appearing at the signal terminal is transferred as a sensed voltage to the capacitor;
   means for providing a timed digital signal for application to the signal terminal;
   means for storing the voltage sensed at the signal terminal immediately preceding the occurrence of a timed digital signal;
   means for generating a voltage of a predetermined amplitude in reference to the sensed, stored voltage; and
   means for applying the generated voltage to the signal terminal during the occurrence of the timed digital signal.

3. A circuit according to claim 2, wherein the means for storing the voltage sensed at the signal terminal immediately preceding the occurrence of a timed digital signal comprises:
   a switch interposed between the output of the first amplifier and the capacitor, the switch being normally closed; and
   means for opening the switch in response to a transmit-enable signal immediately preceeding the occurrence of a timed digital signal, whereby the voltage most recently sensed at the signal terminal and transferred to the capacitor is stored in the capacitor.

4. A circuit according to claim 2, wherein the means for storing the voltage sensed at the signal terminal immediately preceding the occurrence of a timed digital signal comprises:
   a capacitor having positive and negative terminals and having a negative terminal coupled to ground;
   means for transferring continuously a voltage appearing at the signal terminal to the capacitor and applying the voltage to the positive terminal of the capacitor; and
   means for interrupting such continuous voltage transfer from the signal terminal to the capacitor when a timed digital data signal is provided to retain in the capacitor the voltage transferred from the signal terminal immediately prior to such interruption.

5. A circuit according to claim 4, wherein the means for generating a voltage of a predetermined amplitude in reference to the sensed, stored voltage comprises:
   means for generating a first voltage offset by a predetermined value with respect to the stored voltage; and
   means for inverting the first offset voltage with respect to the stored voltage to generate a second voltage offset oppositely by the predetermined value with respect to the stored voltage.

6. A circuit according to claim 5, wherein the means for applying the generated voltage to the signal terminal during the occurrence of the timed digital signal comprises means for selectively coupling one of the first and second offset voltages to the signal terminal in response to the application of one type of a timed digital data signal to the selective coupling means and for selectively coupling the other of the first and second offset voltages to the signal terminal in response to the application of a second type of a timed data signal to the selective coupling means, such that the first and second offset voltages are applied to the signal terminal upon and in the order of occurrence of first and second type of timed digital data signal at the selective coupling means.

7. A circuit according to claim 6, wherein the means for transferring continuously a voltage appearing at the signal terminal to the capacitor comprises first and second amplifiers, the first amplifier having a noninverting input terminal coupled to the signal terminal and an output coupled to the positive terminal of the capacitor and to a noninverting input terminal of the second amplifier, the second amplifier having an output coupled back to its inverting input to configure the second amplifier in a voltage follower mode, the output of the second amplifier being further coupled to an inverting input terminal of the first amplifier to configure the first amplifier in a voltage follower mode.

8. A circuit for applying a sequence of digital data signals to a signal input node of a modulation circuit coupled to an FM radio oscillator circuit, which comprises:
   a sensing circuit having a high impedance voltage sensing terminal coupled to the signal input node of the modulation circuit for sensing a steady state DC component at the signal input node during first periods during which no digital data signals are applied to said signal input node of the modulation circuit;
   means for continuously storing a most recent value of the voltage sensed by the sensing circuit;
   means for continuously generating first and second voltages with respect to the most recent value of stored voltage, such first and second voltages being offset by an equal value to the positive and negative side of said stored voltage;
   means for decoupling the sensing terminal from the signal input node of the modulation circuit at the termination of any of said first periods and the beginning of second periods alternating with such first periods during which second periods digital data signals are to be applied to said signal input node, and for recoupling the sensing terminal to the signal input node at the beginning of any first period; means, having a signal input terminal for receiving said digital data signals and an output terminal, for selectively applying one of said first and second voltages to said output terminal in response to the receipt at the signal input terminal of a logical "one" data pulse and for selectively applying the other of said first and second voltages to said output terminal in response to the receipt of a logical "zero" data pulse; and means, operative during any of said second periods, for coupling said selectively applied first and second voltages at the output terminal to the signal input node of the modulation circuit.

9. A circuit according to claim 8, wherein the sensing circuit comprises first and second amplifiers, the first amplifier having a noninverting input terminal coupled to the signal input node of the modulation circuit and an output terminal coupled to a noninverting input terminal of the second amplifier, the second amplifier having an output terminal coupled back to its inverting input terminal to configure the second amplifier in a voltage follower mode, the output of the second amplifier being further coupled to an inverting input terminal of the first amplifier to configure the first amplifier in a voltage follower mode.

10. A circuit according to claim 9, wherein the decoupling means comprises a first switch coupled between the output terminal of the first amplifier and the noninverting input terminal of the second amplifier, the switch being closed during said first periods and open during said second periods, and wherein the means, operative during said second periods, for coupling said selectively applied first and second voltages at the output terminal to the signal input node of the modulator circuit comprises a second switch coupled between the noninverting and inverting input terminals of the first amplifier, the switch being open during said first periods and closed during said second periods.

11. A circuit according to claim 10, wherein the means for continuously storing a most recent value of the voltage sensed comprises a capacitor coupled between the noninverting input terminal of the second amplifier and an electrical ground.

12. A circuit according to claim 11, wherein the means for continuously generating first and second voltages comprises:
    means for providing a voltage at a selectively adjustable value between that of a voltage at the output terminal of the second amplifier and ground;
    a third amplifier coupled as a voltage follower amplifier;
    means for coupling said selectively adjustable voltage to the noninverting input terminal of the third amplifier, the output of said third amplifier representing the second voltage; and
    means for inverting the first voltage with respect to the voltage at the output terminal of the second amplifier, the voltage so inverted representing the first voltage.

13. A circuit according to claim 12, further comprising a signal shaping filter coupled between the output terminal of the means for selectively applying said first and second voltages and the inverting input terminal of the first amplifier.

14. A method of adjusting a high signal amplitude and a low signal amplitude of timed digital signals to a reference voltage, comprising the steps of:
    during a period of non-transmission of such timed digital signals, sensing a bias voltage representative of an unmodulated frequency at a signal terminal of a radio transmitter of frequency modulated signals;
    upon receipt of a transmit-enable signal, storing the sensed bias voltage as a reference voltage;
    generating signal voltages of a predetermined negative and positive offset amplitude with respect to such stored reference voltage; and
    selectively applying one of the generated voltages to the signal terminal to represent high data pulses of such timed digital signals, and the other of the generated voltages to the signal terminal to represent low data pulses of the timed digital signals.

15. A method of adjusting the signal amplitude of timed digital signals to a reference voltage, comprising the steps of:
    during a period of non-transmission of such timed digital signals, sensing a bias voltage representative of an unmodulated frequency at a signal terminal of a radio transmitter of frequency modulated signals through a high impedance terminal of a first amplifier;
    applying the simplified output of the first amplifier to a noninverting input of a voltage follower amplifier and to a storage capacitor;
    applying the amplified output of the voltage follower amplifier to an inverting input terminal of the first amplifier to configure the first amplifier in a voltage follower mode, whereby the output voltage of the first amplifier is driven to the voltage of the sensed bias voltage;
    upon receipt of a transmit-enable signal, storing the sensed bias voltage as a reference voltage;
    generating signal voltages of a predetermined negative and positive offset amplitude with respect to such stored reference voltage; and
    selectively applying the generated voltages in sequence corresponding to a predetermined sequence of high and low data pulses of such timed digital signals to the signal terminal.

16. A method of adjusting the signal amplitude of timed digital signals according to claim 15, wherein the step of generating signal voltages of a predetermined negative and positive offset amplitude with respect to such stored reference voltage comprises the steps of:
    generating a first offset voltage having a predetermined value with respect to the stored voltage; and
    inverting the first offset voltage with respect to the stored voltage to generate a second, oppositely offset voltage with respect to the stored voltage.

17. A method of frequency modulating a radio frequency transmitter with binary data having a first data signal level and a second data signal level, the transmitter having a modulator that is responsive to a modulator signal, to maintain the transmitter within a predetermined frequency deviation above and below the transmitter carrier frequency, comprising the steps of:
    sampling the level of said modulator signal between transmissions of said binary data over said transmitter to provide a quiescent signal level that corresponds to the carrier frequency of said transmitter;
    generating a first modulator signal level that is less than said quiescent signal level by a predetermined amount to represent said first binary data level;
    generating a second modulator signal level that is greater than said quiescent signal level by said predetermined amount to represent said second binary data level;

applying said first modulator signal level to said transmitter modulator when said binary data is at said first binary data level to cause a first frequency deviation of predetermined frequency shift in one direction from said carrier frequency; and applying said second modulator signal level to said transmitter modulator when said binary data is at said second binary data level to cause a second frequency deviation of said predetermined frequency shift in the other direction from said carrier frequency.

18. The method recited in claim 17, further comprising the step of storing the level of said sampled modulator signal during said binary data transmissions to maintain said quiescent signal level during said binary data transmissions.

19. The method recited in claim 18, wherein the step of generating the first modulator signal level comprises the step of subtracting said predetermined amount from said stored modulator signal level.

20. The method recited in claim 18, wherein the step of generating the second modulator signal level comprises the step of adding said predetermined amount to said stored modulator signal level.

21. An apparatus for frequency modulating a radio frequency transmitter with binary data having a first data signal level and a second data signal level, the transmitter having a modulator that is responsive to a modulator signal, to maintain the transmitter within a predetermined frequency deviation above and below the transmitter carrier frequency, comprising:

means for sampling the level of said modulator signal between transmissions of said binary data over said transmitter to provide a quiescent signal level that corresponds to the carrier frequency of said transmitter;

means for generating a first modulator signal level that is less than said quiescent signal level by a predetermined amount to represent said first binary data level;

means for generating a second modulator signal level that is greater than said quiescent signal level by said predetermined amount to represent said second binary data level;

means for applying said first modulator signal level to said transmitter modulator when said binary data is at said first binary data level to cause a first frequency deviation of predetermined frequency shift in one direction from said carrier frequency; and means for applying said second modulator signal level to said transmitter modulator when said binary data is at said second binary data level to cause a second frequency deviation of said predetermined frequency shift in the other direction from said carrier frequency.

22. The apparatus recited in claim 21, further comprising means for storing the level of said sampled signal during said binary data transmissions to maintain said quiescent signal level during said binary data transmissions.

23. The apparatus recited in claim 22, wherein the means for generating the first modulator signal level comprises means for subtracting said predetermined amount from said stored modulator signal level.

24. The apparatus recited in claim 22, wherein the means for generating the second modulator signal level comprises means for adding said predetermined amount to said stored modulator signal level.

25. An apparatus for frequency modulating a radio frequency transmitter with binary data having a first data signal level and a second data signal level, the transmitter having a modulator that is responsive to a modulator signal, to maintain the transmitter within a predetermined frequency deviation above and below the transmitter carrier frequency, comprising:

means for sampling the level of said modulator signal between transmissions of said binary data over said transmitter to provide a quiescent signal level that corresponds to the carrier frequency of said transmitter;

means for storing the level of said sampled signal during said binary data transmissions to maintain said quiescent signal level during said binary data transmissions;

means for generating a first modulator signal that is less than said quiescent signal level by a predetermined amount, by subtracting said predetermined amount from said stored modulator signal level, to represent said first binary data level;

means for generating a second modulator signal that is greater than said quiescent signal level by said predetermined amount, by adding said predetermined amount to said stored signal level, to represent said second binary data level;

means for applying said first modulator signal level to said transmitter modulator when said binary data is at said first binary data level to cause a first frequency deviation of predetermined frequency shift in one direction from said carrier frequency; and means for applying said second modulator signal level to said transmitter modulator when said binary data is at said second binary data level to cause a second frequency deviation of said predetermined frequency shift in the other direction from said carrier frequency.

* * * * *